(12) United States Patent
Saito et al.

(10) Patent No.: US 7,847,662 B2
(45) Date of Patent: Dec. 7, 2010

(54) INDUCTANCE ELEMENT, METHOD FOR MANUFACTURING THE SAME, AND SWITCHING POWER SUPPLY USING THE SAME

(75) Inventors: Tadao Saito, Yokohama (JP); Kazumi Sakai, Yokohama (JP); Katsuhiko Yamada, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 0 days.

(21) Appl. No.: 12/530,108

(22) PCT Filed: Apr. 16, 2008

(86) PCT No.: PCT/JP2008/000998

§ 371 (c)(1),
(2), (4) Date: Sep. 4, 2009

(87) PCT Pub. No.: WO2008/132810

PCT Pub. Date: Nov. 6, 2008

(65) Prior Publication Data

US 2010/0085778 A1   Apr. 8, 2010

(30) Foreign Application Priority Data

Apr. 17, 2007   (JP) ............................. 2007-108002

(51) Int. Cl.
*H01F 27/02* (2006.01)
*H01F 7/06* (2006.01)
*H01F 27/28* (2006.01)

(52) U.S. Cl. ........................ 336/96; 336/90; 336/229; 336/92; 29/602.1

(58) Field of Classification Search ................ 336/92, 336/96, 60, 229
See application file for complete search history.

(56) References Cited

U.S. PATENT DOCUMENTS 4,543,554 A * 9/1985 Muellenheim et al. ........ 336/83

(Continued)

FOREIGN PATENT DOCUMENTS

JP    58 164203    9/1983

(Continued)

OTHER PUBLICATIONS

U.S. Appl. No. 12/599,315, filed Nov. 9, 2009, Saito, et al.

(Continued)

*Primary Examiner*—Anh T Mai
(74) *Attorney, Agent, or Firm*—Oblon, Spivak, McClelland, Maier & Neustadt, L.L.P.

(57) ABSTRACT

An inductance element (1) includes a doughnut-shaped magnetic core (2) having a wound body or a stacked body of a magnetic ribbon, a bottomed container (3) in which the doughnut-shaped magnetic core (2) is housed, and a conductive lead portion (5) inserted into a hollow section of the doughnut-shaped magnetic core (2) housed in the bottomed container (3). An open section of the bottomed container (3) is covered with an adhesive portion (4) which integrally fixes the doughnut-shaped magnetic core (2), the bottomed container (3) and the conductive lead portion (5). The adhesive portion (4) is entered into a gap between the doughnut-shaped magnetic core (2) and the bottomed container (3) and a gap between the bottomed container (3) and the conductive lead portion (5) in a range of 5 to 50% in average to a thickness of the doughnut-shaped magnetic core (2).

14 Claims, 4 Drawing Sheets

U.S. PATENT DOCUMENTS

| | | | |
|---|---|---|---|
| 4,958,134 A | | 9/1990 | Sawa et al. |
| 6,031,442 A | * | 2/2000 | Nakazawa ................... 336/96 |
| 6,774,756 B2 | * | 8/2004 | Zhao ........................ 336/83 |
| 7,362,201 B2 | * | 4/2008 | Saegusa et al. ............... 336/90 |
| 2003/0078005 A1 | * | 4/2003 | Recht ........................ 455/63 |

FOREIGN PATENT DOCUMENTS

| | | |
|---|---|---|
| JP | 1 64311 | 3/1989 |
| JP | 5 79933 | 10/1993 |
| JP | 8 339932 | 12/1996 |
| JP | 2530277 | 12/1996 |
| JP | 2602843 | 4/1997 |
| JP | 10 251552 | 9/1998 |
| JP | 11 345714 | 12/1999 |
| JP | 2001 319814 | 11/2001 |
| JP | 2004 186573 | 7/2004 |
| JP | 2004-304064 A * | 10/2004 |

OTHER PUBLICATIONS

U.S. Appl. No. 12/530,108, filed Sep. 4, 2009, Saito, et al.

JIS Z 2246:2000 "Shore hardness test-Test method", Japanese Industrial Standard, (2000) (with English Translation).

JIS B 7727:2000 "Shore hardness test-Verification of testing machines", Japanese Industrial Standard, (2000) (with English Translation).

JIS B 7731: 2000 "Shore hardness test-Calibration of reference blocks", Japanese Industrial Standard. (2000) (with English translation).

* cited by examiner

INDUCTANCE ELEMENT, METHOD FOR MANUFACTURING THE SAME, AND SWITCHING POWER SUPPLY USING THE SAME

TECHNICAL FIELD

The present invention relates to an inductance element, its manufacturing method, and a switching power supply using the inductance element.

BACKGROUND ART

The noise from a switching power supply mounted on electronic equipment is restricted by classes as represented by the FCCI. There are various causes of generating a noise in the power supply, and the noise is mainly generated around a semiconductor element which turns on/off a large amount of power. Especially, a high-frequency component propagates as the radiated noise through space and causes a malfunction of various types of electronic equipment. Therefore, a regulation value is set for each frequency band. The switching power supply is provided with an anti-noise measure for a semiconductor element, mainly a MOS-FET or a diode. As a typical example of the anti-noise measure for the MOS-FET or the diode, there is an anti-noise measure using a CR snubber or ferrite beads.

The anti-noise measure is selected depending on a balance of the effects, cost and mounting space. When the performance is especially taken into consideration, the anti-noise measure using a Co-based amorphous material is used mainly as described in Reference 1. Since the Co-based amorphous material has excellent magnetic characteristics, its noise reducing effect is better than the ferrite beads. But, a toroidal core using a Co-based amorphous magnetic ribbon is generally covered entirely with a resin, and therefore it has a problem that the resin penetrates between layers of the magnetic ribbon and applies a stress to the toroidal core by contracting when dried, resulting in degradation of the magnetic characteristics.

Meanwhile, Reference 2 and Reference 3 describe a noise suppression element that a core is inserted into a bottomed container, and a lid is fixed to house the core in the container. When the lidded container is used, the problem involved in the contraction of the resin is avoided, and the magnetic characteristics can be suppressed from degrading. But, the lidded container requires that its lid and container body are separately produced and fixed into one body by assembling them. To produce the lid and the container body with a resin material, it is necessary to prepare their independent metal molds and to perform resin molding by using the metal molds.

As described above, the lidded container requires the separate metal molds for the lid and the container body, and their preparation has a problem that the preparation percentage in the production cost is large. Besides, the noise suppression element described in Reference 2 requires a step of inserting the lid into the container body. The noise suppression element described in Reference 3 requires a step of fixing the container body and the lid by welding. Since the noise suppression element using the lidded container requires a step of attaching the lid, it has a problem that it is inferior in mass production.

Reference 1: JP-B2 2602843
Reference 2: JP-A Hei 11-345714 (KOKAI)
Reference 3: JP-A 2001-319814 (KOKAI)

DISCLOSURE OF THE INVENTION

The present invention provides an inductance element which suppresses magnetic characteristics from degrading and omits a lid portion to make it possible to improve mass productivity, its manufacturing method, and a switching power supply using the inductance element.

An inductance element according to an aspect of the present invention comprises a doughnut-shaped magnetic core including a wound body of a magnetic ribbon or a stacked body of magnetic ribbons; a bottomed container in which the doughnut-shaped magnetic core is housed, having a bottom portion disposed at one end and an open section disposed at the other end; a conductive lead portion inserted through a hollow portion of the doughnut-shaped magnetic core housed in the bottomed container; and an adhesive portion, disposed to cover the open section of the bottomed container, integrally fixing the doughnut-shaped magnetic core, the bottomed container and the conductive lead portion, wherein the adhesive portion is entered into a gap between the doughnut-shaped magnetic core and the bottomed container and a gap between the bottomed container and the conductive lead portion in a range of 5 to 50% in average to a thickness of the doughnut-shaped magnetic core from the open section side of the bottomed container.

A method for manufacturing an inductance element according to an aspect of the present invention comprises housing a doughnut-shaped magnetic core having a wound body of a magnetic ribbon or a stacked body of magnetic ribbons into a bottomed container having a bottom portion disposed at one end and an open section disposed at the other end; inserting a conductive lead portion which is undergone bending processing into a hollow portion of the doughnut-shaped magnetic core housed in the bottomed container; coating an adhesive onto the open section of the bottomed container in which the doughnut-shaped magnetic core is housed and the conductive lead portion is inserted; and forming an adhesive portion, which integrally fixes the doughnut-shaped magnetic core, the bottomed container and the lead portion, by drying to cure the adhesive.

A switching power supply according to an aspect of the invention comprises the inductance element according to the aspect of the invention as a noise suppression element.

EXPLANATION OF THE NUMERALS

1 ... Inductance element; 2 ... doughnut-shaped magnetic core; 3 ... bottomed container; 4 ... adhesive portion; 5 ... conductive lead portion; 6 ... wiring board; 7 ... kink portion; 21 ... magnetic ribbon; 31, 51 ... switching power supply; 34 ... transformer; 36 ... FET; 39 ... saturable inductor.

MODE FOR IMPLEMENTING THE INVENTION

Figure 1:
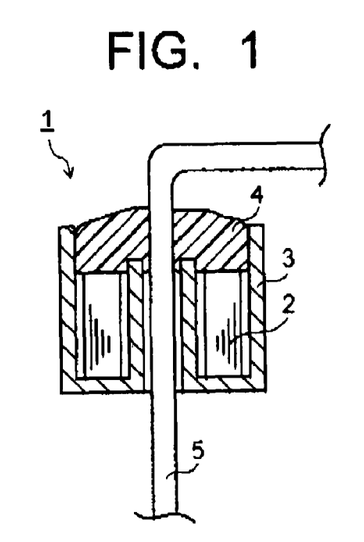
FIG. 1 is a sectional view showing an inductance element according to an embodiment of the invention.
Figure 2:
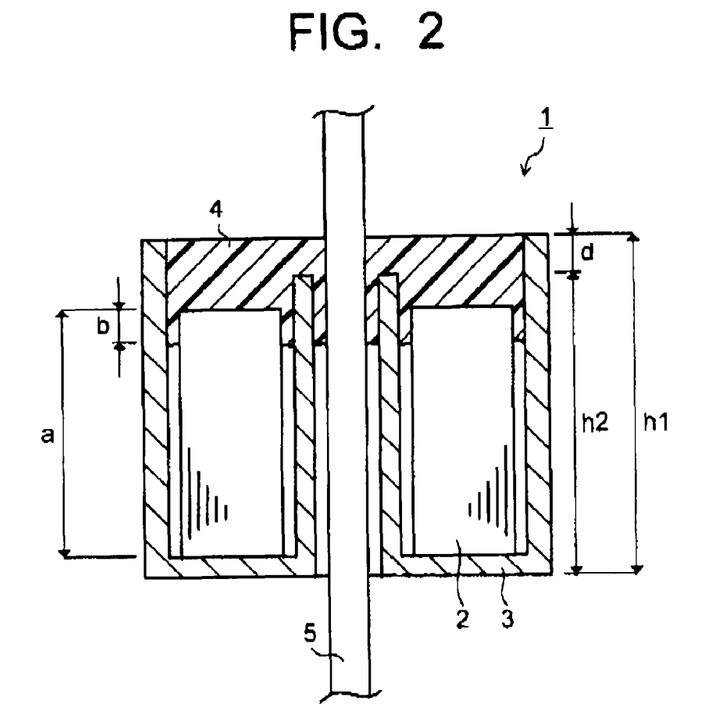
FIG. 2 is a sectional view showing a part of the inductance element shown in FIG. 1 in a magnified form.

Modes of conducting the present invention will be described below with reference to the drawings. FIG. 1 and FIG. 2 are diagrams showing an inductance element according to an embodiment of the invention. An inductance element 1 shown in FIG. 1 and FIG. 2 includes a doughnut-shaped magnetic core 2, a bottomed container 3, an adhesive portion 4 and a conductive lead portion 5. The doughnut-shaped magnetic core 2 is provided with a wound body of a magnetic ribbon or a stacked body of magnetic ribbons. The doughnut-shaped magnetic core 2 is a magnetic core which is formed into a doughnut shape, a so-called toroidal type, by winding or stacking the magnetic ribbon with a hollow portion formed in its center.

For the magnetic ribbon which forms the doughnut-shaped magnetic core 2, magnetic materials such as a Co base amorphous magnetic alloy, an Fe base amorphous magnetic alloy, an Fe base magnetic alloy having a microcrystalline structure, a permalloy, etc. can be used. It is preferable that the amorphous alloy has a composition represented by the following formula (1).

General formula: $(T_{1-a}M_a)_{100-b}X_b$     (1)

(where, T denotes at least one element selected from Fe and Co, M denotes at least one element selected from Ti, V, Cr, Mn, Ni, Cu, Zr, Nb, Mo, Ta and W, X denotes at least one element selected from B, Si, C and P, and a and b denote a value satisfying $0 \leq a \leq 0.5$, $10 \leq b \leq 35$ at %)

The element T is adjusted its composition ratio depending on the required magnetic characteristics such as a magnetic flux density and an iron loss. The element M is an element which is added to control the thermal stability, corrosion resistance and crystallization temperature. The element M is more preferably at least one element selected from Cr, Mn, Zr, Nb and Mo. The contained amount of the element M is 0.5 or less as the value a. If the contained amount of the element M is excessively large, the amount of the element T is decreased relatively, so that the magnetic characteristics of the amorphous magnetic alloy ribbon become low. The value a indicating the contained amount of the element M is preferably 0.01 or more in view of practice.

The element X is an element essential to obtain an amorphous alloy. Especially, B is an element effective to provide a magnetic alloy in an amorphous state. Si is an element effective to assist the formation of an amorphous phase and to increase a crystallization temperature. If the added amount of the element X is excessively large, magnetic permeability is decreased or fragility is caused. If the added amount of the element X is excessively small, it is hard to obtain the magnetic alloy in the amorphous state. Therefore, the contained amount of the element X is preferably determined to be in a range of 10 to 35 at %.

In addition, the Co base amorphous alloy ribbon excelling in a saturable characteristic is preferably used as the magnetic ribbon which configures the doughnut-shaped magnetic core 2. The magnetic characteristics of the doughnut-shaped magnetic core 2 can be improved by using the Co base amorphous alloy ribbon. It is preferable that the Co base amorphous alloy ribbon has a composition represented by the following formula (2).

General formula: $Co_aFe_bM_cSi_dB_e$     (2)

(where, a+b+c+d+e=100 at %, $3 \leq b \leq 7$ at %, $0.5 \leq c \leq 3$ at %, $9 \leq d \leq 18$ at %, $7 \leq e \leq 16$ at %)

In the formula (2), the element M is preferably at least one element selected from Nb, Cr, W, Mo and Ta. By containing the element M as an essential component, the thermal resistance of the Co base amorphous alloy ribbon is improved. By improving the thermal resistance of the Co base amorphous alloy ribbon, the magnetic characteristics of the doughnut-shaped magnetic core 2 can be suppressed from lowering in the subsequent drying step. The element M is desirably Nb. The Nb specially contributes to improvement of the thermal resistance of the Co base amorphous alloy ribbon.

The amorphous alloy ribbon to be used as the magnetic alloy ribbon is preferably produced by applying a liquid quenching method. Specifically, the amorphous alloy ribbon can be obtained by quenching an alloy material, which is adjusted to a predetermined composition ratio, from a molten state at a cooling speed of $10^{5}$° C./sec. or higher. The amorphous alloy produced by the liquid quenching method becomes a ribbon. The amorphous alloy ribbon has a thickness of preferably 30 μm or below, and more preferably 8 to 20 μm. A low-loss magnetic core can be obtained by controlling the thickness of the magnetic ribbon.

It is preferable that the Fe base magnetic alloy having the microcrystalline structure has a composition represented by the following formula (3).

General formula: $Fe_aCu_bM_cSi_dB_e$     (3)

(where, M denotes at least one element selected from 4a group element, 5a group element, 6a group element, Mn, Ni, Co and Al, and a+b+c+d+e=100 at %, $0.01 \leq b \leq 4$ at %, $0.01 \leq c \leq 10$ at %, $10 \leq d \leq 25$ at %, $3 \leq e \leq 12$ at %, and $17 \leq d+e \leq 30$ at %)

In the composition of the formula (3), Cu is an element effective to enhance corrosion resistance, to prevent the crystal grain from becoming coarse, and to improve the soft magnetic characteristics such as an iron loss and magnetic permeability. The element M is an element effective for homogenization of a crystal diameter, for reduction of magnetostriction and magnetic anisotropy, and for improvement of the magnetic characteristics against a temperature change. The magnetic alloy preferably has a microstructure in which crystal grains having a grain diameter of 5 to 30 nm are contained in the alloy at an area ratio of 50% or more, and preferably 90% or more.

For example, the Fe base magnetic alloy ribbon having the microcrystalline structure is produced as follows. First, the amorphous alloy ribbon having the alloy composition of the formula (3) is produced by the liquid quenching method. The amorphous alloy ribbon is thermally treated at −50 to +120° C. of a crystallization temperature for one minute to five hours to precipitate microcrystalline. Otherwise, when the alloy ribbon is produced by the liquid quenching method, the quenching temperature is controlled to precipitate the microcrystalline directly. The alloy ribbon has a thickness of preferably 30 μm or below, and more preferably 8 to 20 μm similar to the amorphous alloy ribbon.

The above-described magnetic ribbon is wound to produce a wound body. Otherwise, the magnetic ribbons are stacked to produce a stacked body. The winding number or the stacking number is appropriately determined depending on the required magnetic characteristics. If necessary, an insulating layer may be disposed on a surface of the magnetic ribbon. The wound body is formed by winding the magnetic ribbon to form a hollow portion at its center. A magnetic core having the hollow portion at the center can be obtained by winding the magnetic ribbon. The stacked body is formed by stacking the magnetic ribbons with the hollow portion formed at the center. The magnetic ribbon is cut to a predetermined length to produce short magnetic strips, and a hole is formed in the centers of the short magnetic strips. The doughnut-shaped magnetic core is formed by stacking the short magnetic strips.

The doughnut-shaped magnetic core 2 is housed in the bottomed container 3. The bottomed container 3 has a cylindrical outer wall portion and a cylindrical inner wall portion which is concentrically disposed within it. A bottom portion is disposed at one end of each of the cylindrical outer wall portion and the cylindrical inner wall portion to close a gap between them. The other ends of the cylindrical outer wall portion and the cylindrical inner wall portion are provided with an open section. The inside of the cylindrical inner wall portion is determined to be a hollow portion. The doughnut-shaped magnetic core 2 is housed between the cylindrical outer wall portion and the cylindrical inner wall portion. The bottomed container 3 preferably has insulating properties. The bottomed container 3 is preferably formed of an insulating resin such as PBT (polybutylene terephthalate), PET (polyethylene terephthalate), LCP (liquid crystal polymer) or the like. Each portion preferably has a thickness in a range of 0.05 to 1 mm.

It is preferable that in the bottomed container 3, the cylindrical outer wall portion is higher than the cylindrical inner wall portion. In addition, it is preferable that the cylindrical outer wall portion is higher than the cylindrical inner wall portion by a range of 0.2 to 2 mm. In other words, the cylindrical outer wall portion and the cylindrical inner wall portion are preferably [height h1 of cylindrical outer wall portion $\geqq$ height h2 of cylindrical inner wall portion] as shown in FIG. 2. In addition, it is preferable that they are [height h1 of cylindrical outer wall portion-height h2 of cylindrical inner wall portion=d=0.2 to 2 mm]. Since the cylindrical outer wall portion is higher than the cylindrical inner wall portion, the adhesive is made difficult to flow outside when the adhesive portion 4 to be described later is used for fixing.

The conductive lead portion 5 is inserted through the hollow portion of the bottomed container 3 in which the doughnut-shaped magnetic core 2 is housed. It is preferable that the conductive lead portion 5 is formed of an electrically conductive metal material such as Cu, Fe or an alloy having them as main components. The conductive lead portion 5 is not limited to a particular wire diameter if it passes through the hollow portion of the bottomed container 3, but it is preferable that a ratio of the diameter of the hollow portion to the wire diameter of the conductive lead portion 5 (wire diameter of the lead portion 5/wire diameter of the lead portion) is in a range of 1 to 4. Thus, they can be fixed well by the adhesive portion 4. An insulation coating may be disposed on the surface of the conductive lead portion 5. And, solderability can be improved by forming a coating of tin plating or the like on the surface of the conductive lead portion 5.

Figure 3:
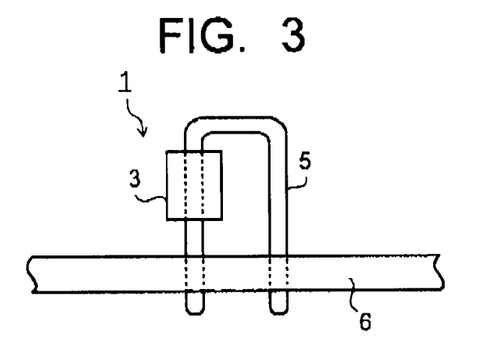
FIG. 3 is a diagram showing a mounted structure of the inductance element according to the embodiment of the invention.
Figure 4:
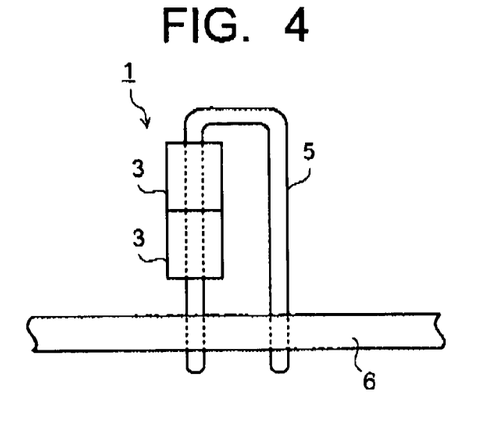
FIG. 4 is a diagram showing a modified example of the inductance element shown in FIG. 3.
Figure 5:
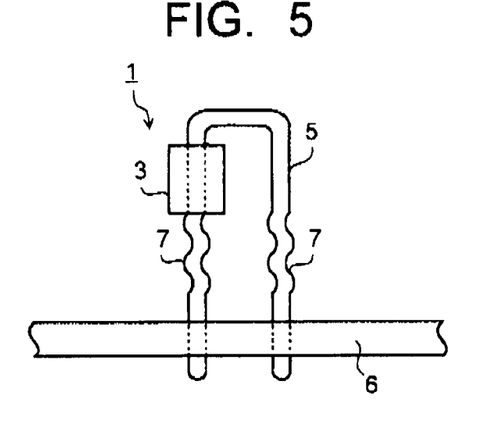
FIG. 5 is a diagram showing another modified example of the inductance element shown in FIG. 3.

The length of the conductive lead portion 5 is arbitrary. The conductive lead portion 5 is desired to be bent so to have a u shape as shown in FIG. 3 to FIG. 5. To mount the inductance element 1 on a wiring board (mother board) 6 which configures the switching power supply and the like, the conductive lead portion 5 is inserted and soldered in the wiring board 6. The conductive lead portion 5 having the bent shape excels in mountability on the wiring board 6. For example, the bottomed container 3 is fixed to one of the portions of the conductive lead portion 5 which are perpendicular to the wiring board 6.

To mount the inductance element 1 on the wiring board 6, the inductance element 1 is preferably arranged so that the adhesive portion 4 is positioned on the side opposite to the wiring board 6. The conductive lead portion 5 is fixed to the wiring board 6 by soldering. There is a possibility that the adhesive portion 4 is melted by heat in the soldering step to dropout the doughnut-shaped magnetic core 2 from the conductive lead portion 5. For example, heat of the soldering process is transferred to the adhesive portion 4 through the conductive lead portion 5 or heats the whole substrate as in a reflow process. Even when heat is transferred to the adhesive portion 4, the adhesive portion 4 can be made insusceptible to the influence of heat by disposing it on the side opposite to the substrate 6.

It is preferable that the conductive lead portion 5 which is undergone the bending processing in advance is inserted through the hollow portion of the bottomed container 3. Then, the adhesive portion 4 is formed. Thus, the fixed position of the bottomed container 3 can be kept constant. In addition, when the conductive lead portion 5 is subjected to the bending processing after it is inserted through the hollow portion of the bottomed container 3, there is a possibility that the characteristics are degraded by a stress applied to the doughnut-shaped magnetic core 2 or the adhesive portion 4. The degradation of the characteristics due to the stress can be suppressed by insertion of the conductive lead portion 5 having the bent shape through the hollow portion of the bottomed container 3.

The adhesive portion 4 is formed by inserting the conductive lead portion 5 through the hollow portion of the bottomed container 3 in which the doughnut-shaped magnetic core 2 is housed, coating the adhesive on the open section of the bottomed container 3 and drying it to solidify. The adhesive portion 4 is formed to cover the open section of the bottomed container 3, and integrally fix the doughnut-shaped magnetic core 2, the bottomed container 3 and the conductive lead portion 5. Here, the solidified state of the adhesive agent is called as the adhesive portion 4. The "integral fixing" means a fixed state of the doughnut-shaped magnetic core 2, the bottomed container 3 and the conductive lead portion 5 by the continuous adhesive portion 4.

In the inductance element 1 of this embodiment, the open section of the bottomed container 3 in which the doughnut-shaped magnetic core 2 is housed is covered with the adhesive portion 4, and the doughnut-shaped magnetic core 2, the bottomed container 3 and the conductive lead portion 5 are integrally fixed with the adhesive portion 4. Therefore, it is not necessary to provide a lid independent of the bottomed container 3. And, metal molds for the lid are unnecessary. A process of attaching the lid is also unnecessary. Accordingly, the production process of the inductance element 1 can be simplified, and the production cost can be reduced.

The adhesive portion 4 is formed by curing the adhesive, and for example a bonding strength of 1 kgf or more can be obtained easily. Therefore, the bottomed container 3 in which the doughnut-shaped magnetic core 2 is housed can be prevented from falling out when the inductance element 1 is mounted on the wiring board 6. The bonding strength of 1 kgf or more means that the adhesive portion 4 is not peeled when a load of 1 kg is applied by means of a weight or the like. Meanwhile, when the lid which is formed by curing the resin is press fitted into the container, it tends to come out of the container. In addition, the lid might be separated when the lead portion is inserted. Especially, when the press fitting only is employed, the lid tends to separate easily when the lead portion is inserted from the side opposite to the press fitting direction. It is because the bonding strength cannot be improved by the press fitting alone.

The adhesive for forming the adhesive portion 4 is not limited to particular one, but a silicone resin-based adhesive, an epoxy resin-based adhesive, a phenol resin-based adhesive, an acrylic resin-based adhesive, a polyurethane resin-based adhesive or the like is used. If it is possible to cure the adhesive at room temperature, production efficiency of the inductance element 1 is improved. But, considering shortening of a drying process and mechanical properties after curing, it is preferable that the adhesive is dried at a temperature in a range of 90 to 150° C. for a range of 30 minutes to two hours. It is more preferable that the drying conditions are determined to be 110 to 130° C. and 50 to 70 minutes.

When the drying temperature of the adhesive is less than 90° C., it is necessary to increase the drying time. When the drying time becomes long, the penetration range of the adhesive to the doughnut-shaped magnetic core 2 becomes excessively large. Specifically, the adhesive becomes easy to penetrate over 30% of the interior of the doughnut-shaped magnetic core 2. When the drying temperature of the adhesive exceeds 150° C., the drying time decreases, but the magnetic characteristics of the doughnut-shaped magnetic core 2 might be lowered. The above production conditions can be applied to improvement of the production efficiency of the inductance element 1. Therefore, the mass productivity of the inductance element 1 is improved considerably.

It is preferable that the adhesive is coated to have a cured thickness in a range of 0.3 to 2 mm. Here, it is preferable that a liquid adhesive is used. The liquid adhesive can be coated easily by means of a dispenser. In addition, the filler nozzle of the dispenser can be aligned easily to the open section of the bottomed container 3. The liquid adhesive can be prevented from leaking by adjusting its coating amount. For example, coating to drying processes of the adhesive are conducted with the tip ends of the conductive lead portion (conductive lead portion having a bent portion) 5, which is inserted through the hollow portion of the bottomed container 3, fixed to a base. Thus, the adhesive can be coated efficiently to plural bottomed containers 3, and the efficiency of the drying process is also improved.

Hardness (Shore hardness A) of the adhesive portion 4 formed by curing the adhesive is preferably in a range of 20 to 100 and more preferably in a range of 50 to 70. When the hardness (Shore hardness A) of the adhesive portion 4 exceeds 100, a stress to the doughnut-shaped magnetic core 2 becomes large, and there is a possibility that the magnetic characteristics of the doughnut-shaped magnetic core 2 are adversely affected. The hardness (Shore hardness A) of the adhesive portion 4 is more preferably 70 or below. As an adhesive which is provided with such hardness, an acryl modified silicone resin-based adhesive is available.

The adhesive forming the adhesive portion 4 may be only one kind or a mixture of two or more kinds of adhesives. A lower limit value of the hardness of the adhesive portion 4 is not limited to a particular value, but Shore hardness A of 20 or more is preferable in view of strength of the adhesive portion 4. In addition, the hardness (Shore hardness A) of the adhesive portion 4 is more preferably 50 or more. The hardness should be measured according to JIS-Z-2246 (test methods), JIS-B-7727 (testing machines) and JIS-B-7731 (test specimens). Hardness of hard resin such as epoxy resin should be measured according to Shore hardness D.

In the inductance element 1 of this embodiment, when the doughnut-shaped magnetic core 2, the bottomed container 3 and the conductive lead portion 5 are integrally fixed with the adhesive portion 4, the adhesive portion 4 enters into a gap between the doughnut-shaped magnetic core 2 and the bottomed container 3 and a gap between the bottomed container 3 and the conductive lead portion 5. The adhesive portion 4 penetrates in a range of 5 to 50% in average to the thickness of the doughnut-shaped magnetic core 2 from the open section of the bottomed container.

FIG. 2 shows a state that the adhesive portion 4 is entered each gap. In FIG. 2, "a" indicates a thickness of the doughnut-shaped magnetic core 2, and "b" indicates a thickness of the adhesive portion 4 which has entered in the thickness direction of the doughnut-shaped magnetic core 2. The adhesive portion 4 enters the gap between the doughnut-shaped magnetic core 2 and the bottomed container 3 and the gap between the bottomed container 3 and the conductive lead portion 5 so that value [(b/a)×100(%)] becomes 5 to 50%. The thickness b is not required to be uniform, and there may be a portion (b=0) where no adhesive portion 4 has entered. A penetration ratio of the adhesive portion 4 entering the gaps is adequately in a range of 5 to 50% in average.

For the state that the adhesive portion 4 has entered, a thickness corresponding to "b" was measured at a total of six positions including four positions in the gap between the doughnut-shaped magnetic core 2 and the bottomed container 3 (the two positions in the gap between the outer wall portion and the magnetic core and the two positions in the gap between the inner wall portion and the magnetic core) and two positions in the gap between the bottomed container 3 and the conductive lead portion 5 (the two positions in the gap between the inner wall portion and the lead portion), an average value of the obtained values is determined, and the entered range (average value) of the adhesive portion 4 is determined from equation [(b/a)×100%]. The thickness b shall be measured on a cross section including the lead portion 5 as shown in FIG. 2.

When the adhesive portion 4 enters into the gaps, the adhered area between the bottomed container 3 and the conductive lead portion 5 becomes large, and the bonding strength between the bottomed container 3 and the conductive lead portion 5 and also between the doughnut-shaped magnetic core 2 and the bottomed container 3 becomes high. When the penetration ratio of the adhesive portion 4 is less than 5%, the bonding strength between the adhesive portion 4 and the conductive lead portion 5 becomes insufficient, and a problem occurs when the inductance element 1 is mounted on the wiring board 6. When the penetration ratio of the adhesive portion 4 exceeds 50%, the stress applied to the doughnut-shaped magnetic core 2 becomes large, and the magnetic characteristics are degraded. To prevent the degradation of the bonding strength and the magnetic characteristics, the penetration ratio of the adhesive portion 4 is more preferably in a range of 10 to 40%.

It is further preferable that the adhesive portion 4 penetrates in a range of 5 to 30% of the cross-sectional area of the doughnut-shaped magnetic core 2. When the doughnut-shaped magnetic core 2 housed in the bottomed container 3 is cut parallel to the hollow portion through the center of the doughnut and the cross-sectional area of the magnetic core 2 is determined to be 100%, it is preferable that the adhesive portion 4 penetrates into the doughnut-shaped magnetic core 2 with an area ratio of 5 to 30%. Thus, the bonding strength among the doughnut-shaped magnetic core 2, the bottomed container 3 and the conductive lead portion 5 can be improved with the magnetic characteristics of the doughnut-shaped magnetic core 2 prevented from degrading.

Figure 6:
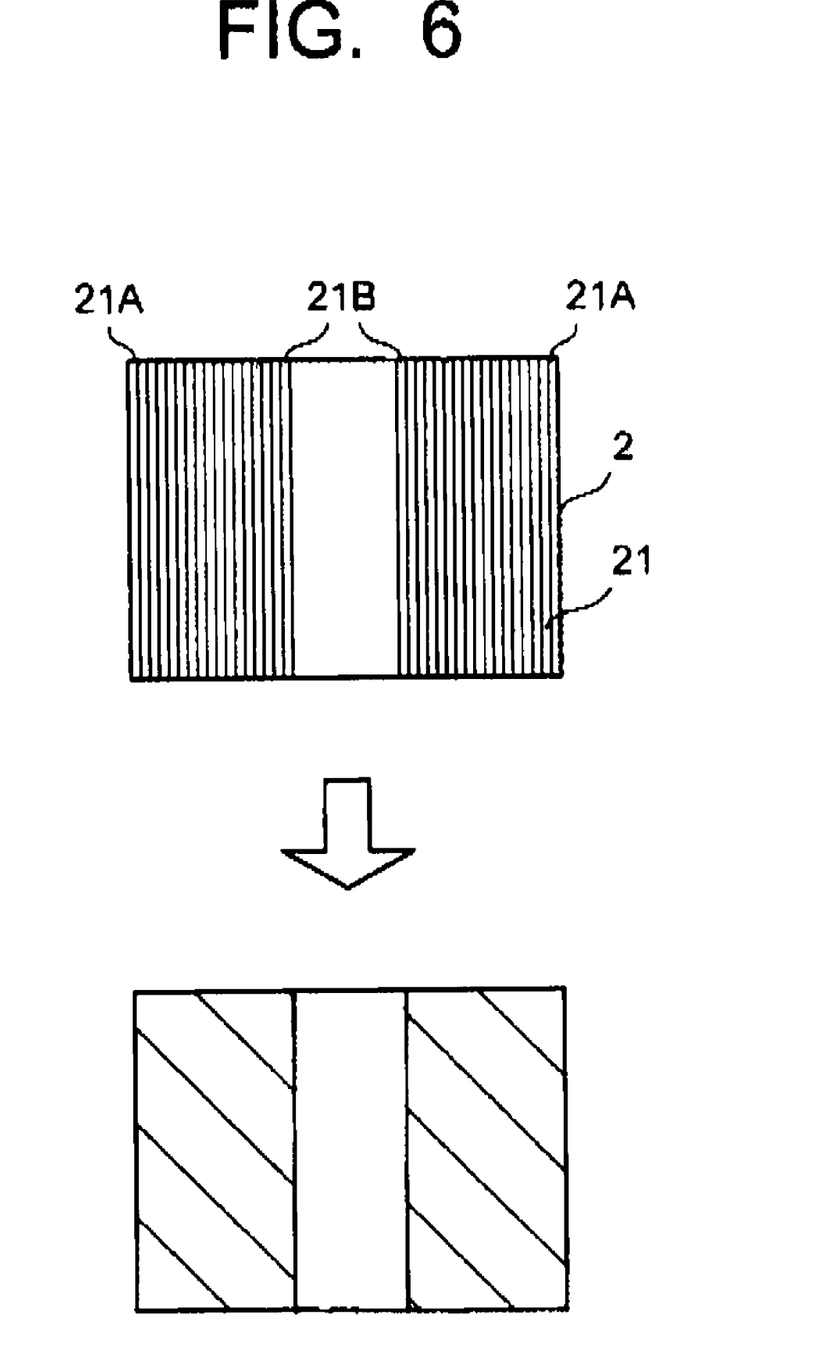
FIG. 6 is a diagram showing an example of the cross section structure of a magnetic core used for the inductance element of the embodiment of the invention.

The cross-sectional area (100%) of the magnetic core 2 indicates a range (hatched area) enclosed by an outermost layer 21A and an innermost layer 21B of a magnetic ribbon 21 as shown in FIG. 6. If a gap is formed between the magnetic ribbon portions when the magnetic ribbon is wound (or stacked), it is included in the cross-sectional area (100%) of the magnetic core. When there is an insulating layer (such as an insulation coating or an insulation film) between the magnetic ribbon portions, it is also included in the cross-sectional area (100%) of the magnetic core.

When it is configured to have the adhesive portion 4 partly penetrated into the doughnut-shaped magnetic core 2, bonding among the doughnut-shaped magnetic core 2, the bottomed container 3 and the lead portion 5 can be made strong by an anchor effect. When the penetration ratio is less than 5%, the anchor effect is not enough to satisfactorily fix the doughnut-shaped magnetic core 2 in the bottomed container 3. Therefore, there is a possibility that the doughnut-shaped magnetic core 2 is disconnected during transportation to fall in a state of making a rattling sound within the bottomed container 3. There is also a possibility of melting the adhesive portion 4 by heat during soldering to cause a dropout of the doughnut-shaped magnetic core 2.

When the penetration ratio of the adhesive portion 4 to the doughnut-shaped magnetic core 2 exceeds 30%, the stress applied to the doughnut-shaped magnetic core 2 becomes excessively large, and the magnetic characteristics of the doughnut-shaped magnetic core 2 might be adversely affected. The penetration ratio of the adhesive portion 4 to the doughnut-shaped magnetic core 2 is more preferably in a range of 10 to 20%. The penetration ratio of the adhesive portion 4 can be adjusted by adjusting the properties and coating amount of the used adhesive and the drying process.

Since the inductance element 1 of this embodiment has the doughnut-shaped magnetic core 2, the bottomed container 3 and the conductive lead portion 5 integrally fixed with the adhesive portion 4, its production process can be simplified, and the production cost can be reduced substantially. In addition, since the bottomed container 3 in which the doughnut-shaped magnetic core 2 is housed is fixed well to the conductive lead portion 5, the inductance element 1 has an excellent handling property. The adhesive portion 4 is visible, and a direction of the inductance element 1 can be checked easily. Since the direction of the inductance element 1 can be checked easily, its direction and alignment on the wiring board 6 can be determined smoothly.

The inductance element 1 may have the doughnut-shaped magnetic core 2 in plural numbers. When the doughnut-shaped magnetic cores 2 are used in plural numbers, the bottomed containers 3 each housing the doughnut-shaped magnetic core 2 therein may be connected in plural numbers as shown in FIG. 4, or the bottomed container 3 housing plural doughnut-shaped magnetic cores 2 therein may be used. To dispose two or more doughnut-shaped magnetic cores 2 in the bottomed container 3, only the doughnut-shaped magnetic core 2 which is on the side of the open section of the bottomed container 3 may be fixed with the adhesive portion 4. At this time, the penetration ratio of only the doughnut-shaped magnetic core 2 fixed with the adhesive portion 4 is measured. When the bottomed containers 3 each housing the doughnut-shaped magnetic core 2 therein are connected in series, the individual doughnut-shaped magnetic cores 2 are preferably fixed with the adhesive portion 4, and the penetration ratio of the each adhesive portion 4 is measured.

The conductive lead portion 5 may have kink portions 7 as shown in FIG. 5. The kink portions 7 are disposed at corresponding positions between the bottomed container 3 housing the doughnut-shaped magnetic core 2 therein and the wiring board. Since the conductive lead portion 5 is provided with the kink portions 7, the bottomed container 3 housing the doughnut-shaped magnetic core 2 therein is prevented from further dropping even when the adhesive portion 4 is melted by heat during soldering. When the adhesive cures at room temperature, the adhesive is cured again by natural cooling, and the doughnut-shaped magnetic core 2, the bottomed container 3 and the conductive lead portion 5 can be fixed integrally.

It is preferable that the kink portion 7 has plural corrugated portions and its length is 5 mm or more. Thus, heat transferred through the conductive lead portion 5 can be radiated effectively. Therefore, the adhesive portion 4 can be effectively suppressed from melting. The kink portion 7 can be formed to have various shapes such as a corrugated shape, an S shape, a jagged shape, a spiral shape and the like. It is preferable that the kink portion 7 has a length of 5 mm or more. The upper limit of the length of the kink portion 7 is not limited, but it is preferably 15 mm or below considering a work of forming the kink portion 7.

It is preferable that the kink portion 7 has a shape that a ratio of its width to the inner diameter of the bottomed container 3 (width of the kink portion/inner diameter of the bottomed container) is in a range of 1.1 to 3. A problem such as displacement or dropout when mounting on the wiring board 6 can be prevented by making the width of the kink portion 7 larger than the inner diameter of the bottomed container 3. If the bottomed container 3 passes over the kink portion 7, it is preferable that the kink portion 7 is formed before the conductive lead portion 5 is inserted into the bottomed container 3. If the bottomed container 3 does not pass over the kink portion 7, the kink portion 7 is formed after the conductive lead portion 5 is inserted through the bottomed container 3. It is preferable that the kink portion 7 is formed in advance.

When the ratio of the width of the kink portion 7 to the inner diameter of the bottomed container 3 is less than 1.1, the effect of disposing the kink portion 7 cannot be obtained sufficiently. Meanwhile, if the ratio exceeds 3, the width of the kink portion 7 is excessively large, and there is a possibility of causing a production failure such as bending of the conductive lead portion 5 at the time of inserting through the inner diameter of the bottomed container 3. The conductive lead portion 5 is mostly made of a metal wire material such as a copper wire. Since the metal wire material has resilience, even if the kink portion 7 is larger than the inner diameter of the bottomed container 3, it can be inserted through the bottomed container 3 by applying a small stress. Therefore, after the kink portion 7 is previously formed on the conductive lead portion 5, it can be inserted through the bottomed container 3.

Since the inductance element 1 of this embodiment does not have a lid, its production process can be simplified, and the production cost can also be reduced substantially. In addition, lowering of the magnetic characteristics (such as reduction of value L) due to the stress at the time of curing of the adhesive can be suppressed by adjusting the penetration ratio of the adhesive portion 4. Therefore, the inductance element 1 exerts an excellent noise reducing effect. This inductance element 1 is suitably used as a noise suppression element for the electronic equipment such as a switching power supply.

The switching power supply is being used for PCs, servers and various fields. Various elements are mounted on the wiring board for the switching power supply. The each element is fixed to the wiring board by soldering. Since countermeasures are taken for the inductance element 1 of this embodiment to prevent the adhesive portion 4 from being melted by heat during soldering, problems such as a displacement and a dropout of the doughnut-shaped magnetic core 2 do not take place easily when soldering. Therefore, since the inductance element 1 also meets a reflow process, it becomes possible to improve the mass productivity of the switching power supply.

Figure 7:
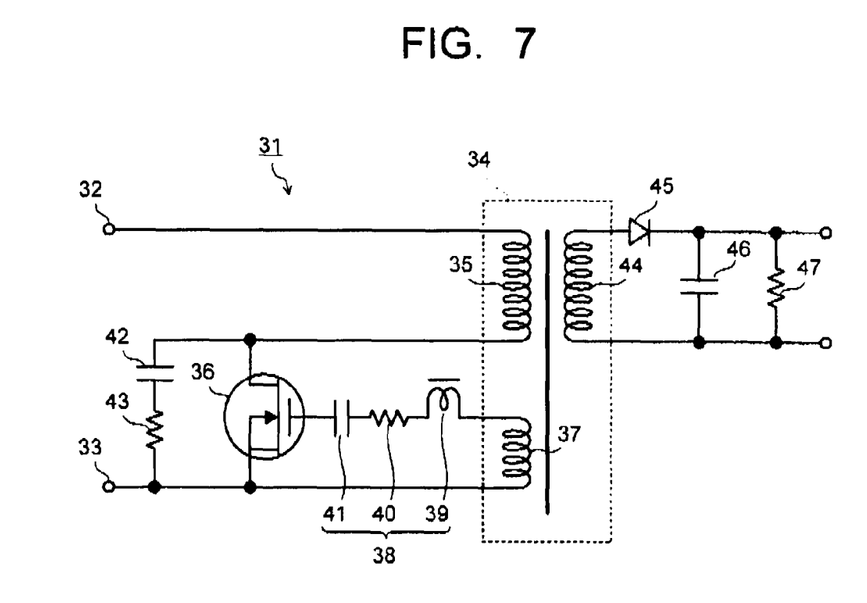
FIG. 7 is a diagram showing a structure of the switching power supply according to a first embodiment of the invention.

FIG. 7 is a circuit diagram showing a structure of the switching power supply according to the first embodiment of the invention. A self-excited fly-back system switching power supply 31 shown in FIG. 7 has a primary winding 35 of a transformer 34 connected in series between input terminals 32, 33 and FET (MOSFET) 36 as a switching element. The transformer 34 is further provided with a winding 37 for a gate circuit drive of the FET 36. In other words, the winding 37 is a positive feedback winding of the transformer 34 which is wound to make the self-oscillation of the FET 36.

A drive circuit 38 for sending the signal of the positive feedback winding 37 to the FET 36 is disposed between the gate terminal of the FET 36 and the positive feedback winding 37. The drive circuit 38 is configured by connecting in series an inductor 39, a resistor 40 and a capacitor 41, and functions as a snubber circuit. The resistor 40 gives an appropriate drive current to the FET 36, and the capacitor 41 improves the drive property of the FET 36. The inductor 39 has saturability and functions to delay the gate signal of the FET ?6?. The inductance element 1 of the embodiment described above is applied to the saturable inductor 39 and functions as a noise suppression element of the FET 36.

A snubber capacitor 42 for absorbing a surge voltage which is generated in the primary winding 35 of the transformer 34 is connected in series between the primary winding 35 of the transformer 34 and the input terminal 33. The snubber capacitor 42 is connected parallel to the FET 36. In addition, a snubber resistor 43 is connected in series to the snubber capacitor 42. A rectifying element 45 and a capacitor 46 are connected as a rectifying/smoothing circuit to a secondary winding 44 of the transformer 34. A resistor 47 is a load.

Figure 8:
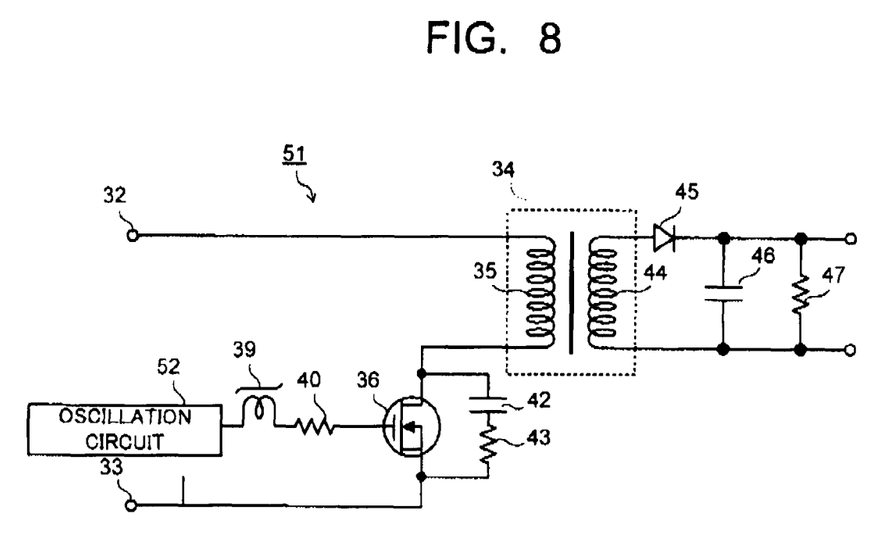
FIG. 8 is a diagram showing a structure of the switching power supply according to a second embodiment of the invention.

FIG. 8 is a circuit diagram showing a structure of the switching power supply according to the second embodiment of the invention. A separately-excited fly-back system switching power supply 51 shown in FIG. 8 is provided with an oscillation circuit 52 as a drive circuit of the FET 36. A saturable inductor 39 and a resistor 40 are connected in series between the FET 36 and the oscillation circuit 52. The saturable inductor 39 functions as the noise suppression element of the FET 36 similar to the first embodiment, and the inductance element 1 of the embodiment is applied.

EXAMPLES

Specific examples of the present invention and the evaluated results are described below.

Examples 1 to 6, Comparative Examples 1 to 2

An amorphous magnetic alloy ribbon (thickness of 18 Ka) having a composition of $(Co_{0.94}Fe_{0.05}Cr_{0.01})_{72}Si_{15}B_{13}$ was wound to form a doughnut-shaped magnetic core (toroidal core). An insulation coating was previously formed on a surface of the magnetic ribbon. The doughnut-shaped magnetic core was determined to have an outer diameter of 3 mm, an inner diameter of 2 mm and a height of 3 mm.

The doughnut-shaped magnetic core was then housed in a PBT bottomed container (outer diameter 3.4 mm, inner diameter 1.6 mm, height 4.5 mm, thickness 0.1 mm). The bottomed container was determined to have [height of outer wall portion 4.5 mm-height of inner wall portion 3.2 mm=1.3 mm]. Then, a conductive lead wire having a diameter of 0.8 mm undergone bending processing was inserted, and the magnetic core, the container and the lead portion were integrally fixed by using an acryl modified silicone resin-based adhesive. The penetration ratio of the adhesive portion was adjusted by changing drying and solidifying conditions of the adhesive.

The inductance elements of Examples 1 to 4 and Comparative Examples 1 to 2 were produced as described above. A tin-plated copper wire was used for the conductive lead portion. In addition, the inductance element of Example 5 was produced with the adhesive changed to an epoxy resin-based type. The inductance element of Example 6 was produced with the adhesive changed to a phenol resin-based type.

The inductance elements of Examples and Comparative Examples were measured for values L. The values L denote values measured in one hour after starting the measurement and after a 1000-hour continuous operation. The value L was measured by an LCR meter under conditions of a frequency of 50 kHz and 1V. The results are shown in Table 1. The penetration ratio (%) of the adhesive portion was determined by cutting it vertically in the thickness direction to pass its center portion and observing the cross section. Hardness (Shore hardness A) of the adhesive portion was measured according to JTS-Z-2246.

TABLE 1

| | Adhesive | Penetration ration of adhesive portion (%) | Hardness of adhesive portion (Shore A) | Value L (μH) | Change rate of value L after 1000 hours (%) |
|---|---|---|---|---|---|
| E1 | Acryl modified silicone resin | 5 | 65 | 5 | 10 to 30% down |
| E2 | Acryl modified silicone resin | 10 | 65 | 4.8 | 10 to 30% down |
| E3 | Acryl modified silicone resin | 30 | 65 | 4.7 | 10 to 30% down |
| E4 | Acryl modified silicone resin | 50 | 65 | 4.7 | 10 to 30% down |
| E5 | Epoxy resin | 10 | 80 | 4.6 | 20 to 40% down |
| E6 | Phenol resin | 10 | 70 | 4.6 | 20 to 40% down |
| CE1 | Acryl modified silicone resin | 1 | 65 | 5 | 10 to 30% down |
| CE2 | Acryl modified silicone resin | 80 | 65 | 4.3 | 50 to 70% down |

*E = Example, CE = Comparative Example

It is apparent from Table 1 that the inductance elements of the examples have a large value L, and their deterioration after 1000 hours is small. In Examples 5, 6 in which the resins had high hardness, the value L was slightly decreased in comparison with Example 2 in which the penetration ratio of the adhesive portion was same. When the penetration ratio of the adhesive portion was large to 80% as in Comparative Example 2, the value L was decreased. It is apparent from the results that when the adhesive is used for integral fixation, the magnetic characteristics are variable depending on the adhering conditions.

Examples 7 to 10

The inductance element of Example 2 was used with the ratio of the adhesive portion penetrating into the magnetic core varied to prepare inductance elements, and the same measurement was conducted. The results are shown in Table 2.

TABLE 2

| | Penetration ratio of adhesive portion (%) | Value L (μH) | Change rate of value L after 1000 hours (%) |
| --- | --- | --- | --- |
| Example 7 | 5 | 4.8 | 10 to 30% down |
| Example 8 | 10 | 4.7 | 10 to 30% down |
| Example 9 | 30 | 4.7 | 10 to 30% down |
| Example 10 | 50 | 4.6 | 15 to 35% down |

As shown in Table 2, when the penetration ratio of the adhesive portion into the gap of the magnetic core exceeds 30%, the magnetic characteristics might be decreased.

Examples 11 to 15, Comparative Example 3

The inductance element of Example 2 was used to prepare inductance elements provided with the kink portion as shown in Table 3. For comparison, the inductance element of Comparative Example 1 was also prepared. A displaced ratio of the magnetic core was measured when individual inductance elements were soldered onto the wiring boards. For the displaced ratio of the magnetic core, the number of the magnetic cores or the containers displaced in the soldering step and the number of the magnetic cores or the containers displaced when the wiring board was turned upside down were counted. It was determined that the kink portion has a length of 5 mm, and the lead portion from the wiring board to the inductance element has a length of 15 mm. The results of measuring the displacement are shown in Table 3.

TABLE 3

| Inductance element | | Direction of adhesive portion | Ratio of (width of kink portion/ inner diameter of bottomed container) | Occurrence ratio of displacement by soldering (%) |
| --- | --- | --- | --- | --- |
| E11 | E2 | Opposite side to wiring board | (No kink portion) | 3 |
| E12 | E2 | Opposite side to wiring board | 1.8 | 1 |
| E13 | E2 | Opposite side to wiring board | 2 | 0 |
| E14 | E2 | Opposite side to wiring board | 3 | 0 |
| E15 | E2 | Same side of wiring board | (No kink portion) | 6 |
| CE3 | CE1 | Opposite side to wiring board | (No kink portion) | 20 |

E = Example, CE = Comparative Example

As shown in Table 3, the inductance elements of the examples were small in the occurrence ratio of displacement of the magnetic core by soldering. It is considered to be caused because of a large adhesion effect of the adhesive portion which has penetrated in a predetermined amount. It was confirmed that the displacement can be prevented better by disposing the kink portion. It is considered that the kink portion improves a heat radiation property because it has a corrugated shape, and soldering heat becomes hard to affect the adhesive portion. In addition, it was found that a sufficient dropout-prevention effect can be obtained when the kink portion has a length of 5 mm or more. Meanwhile, Comparative Example 3 had a small penetration ratio of the adhesive portion, so that an anchor effect was insufficient, and dropouts were many.

Examples 16 to 19

The magnetic core having the shape shown in Table 4 was used to produce inductance elements in the same manner as in Example 1, and the values L were measured. The adhesive was limited to an acryl modified silicone resin-based adhesive. The measured results of the values L are shown in Table 4. It is seen that the inductance elements of the examples have good values L even when the magnetic core size is changed.

TABLE 4

| | Magnetic core size (mm) [outer dia. × inner dia. × height | Container size (mm) [inner wall's outer dia. × outer wall's inner dia. × inner height*] | Penetration ratio of adhesive portion (%) | Hardness of adhesive portion (Shore A) | Value L (μH) |
| --- | --- | --- | --- | --- | --- |
| E16 | 3 × 2 × 4.5 | 3.2 × 1.8 × 4.7 | 15 | 65 | 7.0 |
| E17 | 3 × 2 × 4.5 | 3.2 × 1.8 × 4.7 | 40 | 65 | 6.8 |
| E18 | 4 × 2 × 4.5 | 4.2 × 1.8 × 4.7 | 15 | 65 | 12.0 |
| E19 | 4 × 2 × 4.5 | 4.2 × 1.8 × 4.7 | 40 | 65 | 11.5 |

E = Example; dia. = diameter;
*= Height of inner wall

Examples 20 to 25

The inductance element of Example 2 was used and the height of the outer wall portion and the height of the inner wall portion of the bottomed container were changed as shown in Table 5. The rate of defective appearance caused by the adhesive portion overflown onto the container surface was measured. The results are shown in Table 5.

TABLE 5

|  | Height of outer wall portion of bottomed container (mm) | Height of inner wall of bottomed container (mm) | Rate of defective appearance (%) |
| --- | --- | --- | --- |
| Example 20 | 6 | 6 | 5 |
| Example 21 | 6.2 | 6 | 2 |
| Example 22 | 7 | 6 | 1 |
| Example 23 | 8 | 6 | 0 |
| Example 24 | 10 | 6 | 0 |
| Example 25 | 60 | 7 | 10 |

It is seen from Table 5 that when the height of the outer wall portion and the height of the inner wall portion of the bottomed container are compared and the height of the outer wall portion is equal to or higher than the height of the inner wall portion, defective appearance is not caused easily because the adhesive does not overflow onto the container surface. Especially, when (height of outer wall portion-height of inner wall portion) is 0.2 mm or more, an occurrence rate of defective appearance can be decreased to 2% or below. Even when the (height of outer wall portion-height of inner wall portion) exceeds 2 mm, no further improvement is observed. The (height of outer wall portion-height of inner wall portion) is preferably 0.2 to 2 mm considering the production cost of the container.

The inductance elements of the examples can prevent the magnetic characteristics from degrading and can also improve the mass productivity and reduce the production cost. Since the mountability on the wiring board is also good, the productivity of electronic equipment such as the switching power supply can also be enhanced.

INDUSTRIAL APPLICABILITY

Since the inductance element of the invention need not the use of a lid, the production cost can be reduced, and the mass productivity can be improved. In addition, since the magnetic characteristics are not degraded when the adhesive portion is used for fixing, the inductance element having excellent magnetic characteristics can be provided. This inductance element is suitably used as a noise suppression element (saturable inductor) of the switching power supply or the like.

What is claimed is:

1. An inductance element, comprising:
    a doughnut-shaped magnetic core including a wound body of a magnetic ribbon or a stacked body of magnetic ribbons;
    a bottomed container in which the doughnut-shaped magnetic core is housed, having a bottom portion disposed at one end and an open section disposed at the other end;
    a conductive lead portion inserted through a hollow portion of the doughnut-shaped magnetic core housed in the bottomed container; and
    an adhesive portion, disposed to cover the open section of the bottomed container, integrally fixing the doughnut-shaped magnetic core, the bottomed container and the conductive lead portion,
    wherein the adhesive portion is entered into a gap between the doughnut-shaped magnetic core and the bottomed container and a gap between the bottomed container and the conductive lead portion in a range of 5 to 50% in average to a thickness of the doughnut-shaped magnetic core from the open section side of the bottomed container.

2. The inductance element according to claim 1,
    wherein the bottomed container has a cylindrical outer wall portion, a cylindrical inner wall portion concentrically arranged within the cylindrical outer wall portion, the bottom portion disposed at one end of each of the cylindrical outer wall portion and the cylindrical inner wall portion to close a gap between the cylindrical outer wall portion and the cylindrical inner wall portion, the open section disposed at the other end of each of the cylindrical outer wall portion and the cylindrical inner wall portion, and a hollow portion disposed in the cylindrical inner wall portion; and
    wherein the doughnut-shaped magnetic core is placed between the cylindrical outer wall portion and the cylindrical inner wall portion, and the conductive lead portion is inserted through the hollow portion of the bottomed container.

3. The inductance element according to claim 1,
    wherein the adhesive portion penetrates into the doughnut-shaped magnetic core in a range of 5 to 30% of a cross-sectional area of the doughnut-shaped magnetic core.

4. The inductance element according to claim 1,
    wherein the adhesive portion is formed of a cured body of an acryl modified silicone resin-based adhesive.

5. The inductance element according to claim 1,
    wherein the conductive lead portion has a bent shape to allow mounting on a substrate, and the adhesive portion is arranged to position opposite to the substrate.

6. The inductance element according to claim 5,
    wherein the conductive lead portion has a kink portion formed at a position corresponding to between the doughnut-shaped magnetic core and the substrate, and a width of the kink portion to an inner diameter of the bottomed container is in a range of 1.1 to 3.

7. The inductance element according to claim 1,
    wherein the doughnut-shaped magnetic core is provided in plural numbers.

8. The inductance element according to claim 1,
    wherein the magnetic ribbon is provided with an amorphous magnetic alloy ribbon.

9. A method for manufacturing an inductance element, comprising:
    housing a doughnut-shaped magnetic core having a wound body of a magnetic ribbon or a stacked body of magnetic ribbons into a bottomed container having a bottom portion disposed at one end and an open section disposed at the other end;
    inserting a conductive lead portion which is undergone bending processing into a hollow portion of the doughnut-shaped magnetic core housed in the bottomed container;
    coating an adhesive onto the open section of the bottomed container in which the doughnut-shaped magnetic core is housed and the conductive lead portion is inserted; and
    forming an adhesive portion, which integrally fixes the doughnut-shaped magnetic core, the bottomed container and the lead portion, by drying to cure the adhesive.

10. The method for manufacturing an inductance element according to claim 9, wherein the adhesive is dried at a temperature in a range of 90 to 150° C.

11. The method for manufacturing an inductance element according to claim 9, further comprising, forming a kink portion on the conductive lead portion.

12. The method for manufacturing an inductance element according to claim 9, wherein the adhesive is coated on the open section of the bottomed container with tip ends of the conductive lead portion fixed.

13. The method for manufacturing an inductance element according to claim 9, wherein the adhesive portion penetrates into a gap between the doughnut-shaped magnetic core and the bottomed container and a gap between the bottomed container and the conductive lead portion in a range of 5 to 50% in average to a thickness of the doughnut-shaped magnetic core.

14. A switching power supply comprising the inductance element according to claim 1 as a noise suppression element.

* * * * *